United States Patent
Agarwal et al.

(10) Patent No.: US 8,532,371 B2
(45) Date of Patent: Sep. 10, 2013

(54) METHOD AND APPARATUS FOR EVALUATING COLOR IN AN IMAGE

(75) Inventors: Niraj Agarwal, Windham, NH (US); Michael H. Brill, Kingston, NJ (US)

(73) Assignee: Datacolor Holding AG, Luzern (CH)

(*) Notice: Subject to any disclaimer, the term of this patent is extended or adjusted under 35 U.S.C. 154(b) by 311 days.

(21) Appl. No.: 12/897,583

(22) Filed: Oct. 4, 2010

(65) Prior Publication Data
US 2012/0082374 A1 Apr. 5, 2012

(51) Int. Cl.
*G06K 9/00* (2006.01)

(52) U.S. Cl.
USPC ........................................................ 382/162

(58) Field of Classification Search
None
See application file for complete search history.

(56) References Cited

U.S. PATENT DOCUMENTS

| | | | | |
|---|---|---|---|---|
| 4,967,379 | A * | 10/1990 | Ott | 382/112 |
| 4,975,862 | A * | 12/1990 | Keller et al. | 382/112 |
| 5,159,185 | A * | 10/1992 | Lehr | 250/205 |
| 5,206,707 | A * | 4/1993 | Ott | 356/402 |
| 5,319,215 | A * | 6/1994 | Stibaner et al. | 250/559.4 |
| 5,850,472 | A * | 12/1998 | Alston et al. | 382/162 |
| 6,628,807 | B1 * | 9/2003 | Mumelter et al. | 382/111 |
| 6,983,695 | B2 * | 1/2006 | Mogi et al. | 101/484 |
| 7,020,331 | B2 * | 3/2006 | Saikawa et al. | 382/167 |
| 7,034,968 | B2 * | 4/2006 | Bhaskar et al. | 358/504 |
| 7,230,707 | B2 * | 6/2007 | Ingleson et al. | 356/402 |
| 7,352,488 | B2 * | 4/2008 | Ben-Chorin et al. | 358/1.9 |
| 7,554,586 | B1 | 6/2009 | Imai et al. | |
| 7,773,221 | B2 | 8/2010 | Xu et al. | |
| 8,199,361 | B2 * | 6/2012 | Dokuni | 358/1.9 |
| 2002/0150290 | A1 * | 10/2002 | Robins et al. | 382/162 |
| 2003/0142222 | A1 | 7/2003 | Hordley | |
| 2003/0204410 | A1 * | 10/2003 | Agarwal | 705/1 |
| 2004/0179101 | A1 * | 9/2004 | Bodnar et al. | 348/188 |
| 2004/0197020 | A1 * | 10/2004 | Sones | 382/162 |
| 2004/0218182 | A1 * | 11/2004 | Alman et al. | 356/402 |
| 2004/0240728 | A1 * | 12/2004 | Saikawa et al. | 382/162 |

(Continued)

OTHER PUBLICATIONS

PCT Search Report and Written Opinion for PCT/US11/54620; Feb. 28, 2012.

(Continued)

*Primary Examiner* — Barry Drennan
*Assistant Examiner* — Feng Niu

(57) ABSTRACT

A method for evaluating a color of a sample includes acquiring an image having a plurality of pixels from a sample and a plurality of pixels from known color calibration patches. The image is color calibrated using the known color patches to endow the pixels from the sample with the tristimulus values they would have under one or more known illuminants. The calibrated image is transmitted, together with metadata, to a remote location where further computations and an approval process are performed. The further computations include comparing all of the pixels in the image of a standard that are of a first color to all pixels of a second color in the similarly calibrated image of the sample, where the second color is a color in the image of the sample that is most similar to the first color from the image of the standard.

13 Claims, 3 Drawing Sheets

(56) References Cited

U.S. PATENT DOCUMENTS

| | | | |
|---|---|---|---|
| 2005/0012930 A1* | 1/2005 | Steinfield et al. | 356/425 |
| 2006/0034427 A1* | 2/2006 | Brooks | 378/198 |
| 2006/0159336 A1* | 7/2006 | Uezono | 382/167 |
| 2006/0192861 A1* | 8/2006 | Ohga | 348/222.1 |
| 2007/0024657 A1* | 2/2007 | Zhang et al. | 347/19 |
| 2007/0058860 A1* | 3/2007 | Harville et al. | 382/167 |
| 2007/0242877 A1* | 10/2007 | Peters et al. | 382/167 |
| 2008/0044082 A1* | 2/2008 | Muller | 382/162 |
| 2009/0139297 A1* | 6/2009 | Lu et al. | 73/1.01 |
| 2009/0141975 A1* | 6/2009 | Li | 382/167 |

OTHER PUBLICATIONS

Nieves et al., "Recovering fluorescent spectra with an RGB digital camera and color filters using different matrix factorizations" Applied Optics vol. 46, No. 19, Jul. 1, 2007; Retrieved online Feb. 12, 2012 at: <http;//www.ugr.es/~jnieves/Textos/JLNieves%20etal%20AO2007.pdf>.

Chiao et al., Color signals in natural scenes: characteristics of reflectance spectra and effects of natural illuminants' J. Opt. Soc. Am. A/ vol. 17, No. 2/Feb. 2000, Retrieved online Feb. 12, 2012 at: <http://userpages.umbc.edu/~chiao/josa2000_1.pdf>.

\* cited by examiner

US 8,532,371 B2

METHOD AND APPARATUS FOR EVALUATING COLOR IN AN IMAGE

FIELD OF THE INVENTION

The present invention generally relates to the field of imaging, and more specifically relates to color measurement.

BACKGROUND

Color measurement systems help to improve operational efficiency and product quality in supply chains. For example, color approval offices for the global apparel supply chain, apparel mills and dye houses, paint stores, textile printing shops, carpet manufacturers, manufacturers of wood panels, tiles, vinyl sheets, and laminates, and other industries relying on the digital color workflow require accurate color evaluation and visualization.

Conventionally, spectrophotometers are used to measure product color for solid color areas. These measurements are compared to reference standards to verify product color consistency. In some cases, the measurement and comparison data is transmitted to the buyer for remote color approval. However, some samples (e.g., printed or textured samples) cannot present a large enough area of uniform color to the spectrophotometer viewing port to allow for proper measurement.

SUMMARY OF THE INVENTION

In one embodiment, the present invention is a method and apparatus for evaluating color in an image. In one embodiment, a method for evaluating a color of a sample includes acquiring an image having a plurality of pixels from a sample and a plurality of pixels from known color calibration patches. The image is color calibrated using the known color calibration patches to endow the pixels from the sample with the tristimulus values they would have under one or more known illuminants. The calibrated image is then transmitted, together with metadata, to a remote location where further computations and an approval process are performed. The further computations include comparing all of the pixels in the image of a standard that are of a first color to all pixels of a second color in a similarly calibrated second image, where the second color is a color in the second image that is most similar to the first color from the image of the standard. This results in a color difference metric for multicolor and textured materials that correlates with visual evaluation.

One particular method for evaluating a color of a sample includes acquiring a plurality of images of the sample, where each of the images is acquired under a different one of a plurality of illuminants and each of the images contains a set of samples of known spectral reflectance, and color calibrating the images using the set of samples to estimate a plurality of tristimulus values of the sample under the different illuminants, wherein the color calibrating results in a plurality of color calibrated images including a plurality of pixels.

BRIEF DESCRIPTION OF THE DRAWINGS

The teachings of the present invention can be readily understood by considering the following detailed description in conjunction with the accompanying drawings, in which.

DETAILED DESCRIPTION

In one embodiment, the present invention is a method and apparatus for evaluating color in an image. Embodiments of the invention perform imaging under multiple illuminants that emulate International Commission on Illumination (CIE) reference illuminants in order to capture the color of a sample that cannot be measured using a spectrophotometer. Images taken in this way can be used to facilitate color difference evaluation for monochromatic, textured, and multi-colored samples. For example, a captured image of a batch sample may be compared to an image of a standard sample to verify a match. Parts of the image of a batch sample selected by the user may also be compared to selected parts of a standard sample. The images and associated data can also be shared over a network and integrated in a color approval workflow.

Figure 1:
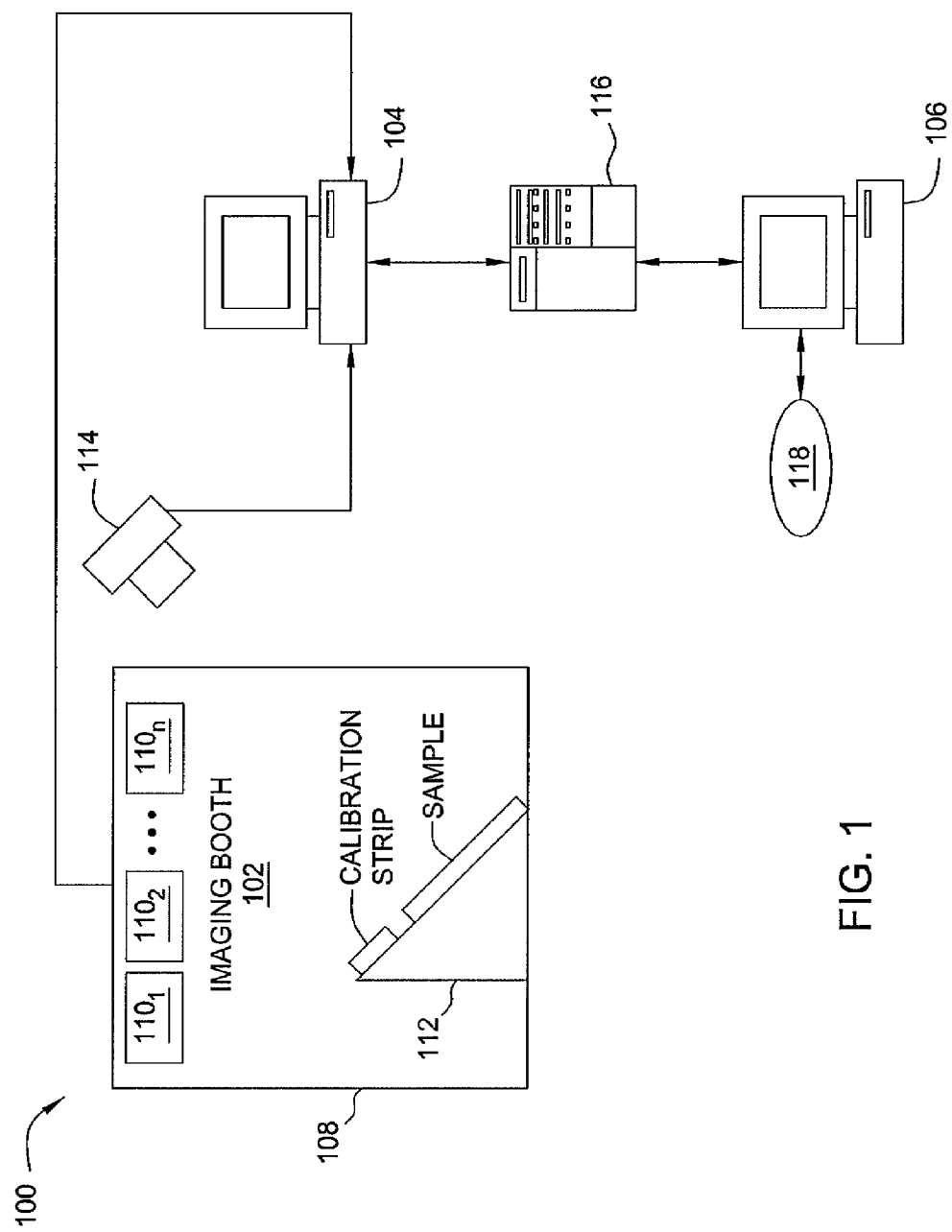
FIG. 1 is a schematic diagram illustrating one embodiment of a system for capturing color-accurate images, according to the present invention.

FIG. 1 is a schematic diagram illustrating one embodiment of a system 100 for capturing color-accurate images, according to the present invention. As illustrated, the main components of the system 100 include an imaging booth 102, a first computing device 104, and a second computing device 106.

The imaging booth 102 comprises a light box or housing 108 within which a plurality of light sources $110_1$-$110_n$ (hereinafter collectively referred to as "light sources 110") are contained. In addition, the imaging booth 102 houses a sample positioning mechanism such as a sample tray or pedestal 112 designed to support a sample to be measured (e.g., a fabric swatch) and a color calibration strip (e.g., a strip including a plurality of color swatches of known spectral reflectance) and/or a gray card. In one embodiment, reference color data for the colors displayed on the calibration strip is pre-measured (e.g., using a spectrophotometer). In one embodiment, the calibration strip is integrated with the pedestal 112.

The light sources 110 each provide an emulation of a different type of reference illuminant. These types of reference illuminants may include, for example, daylight (e.g., CIE standard "D65"), tungsten light (e.g., CIE standard "Illuminant A"), or fluorescent light (e.g., CIE standard "F11"). The light sources 110 are positioned such that the reference illumination emitted by the light sources 110 is incident upon the pedestal 112, and more specifically upon the sample and calibration strip supported on the pedestal 112.

The imaging booth 102 additionally comprises a digital camera 114 that is positioned outside the housing 108. Specifically, the digital camera 114 is positioned in front of the housing 108, which allows the digital camera 114 to view and capture images of the sample housed within the housing 108. In one embodiment, the digital camera 114 is held in position by a bracket (not shown) affixed to the exterior of the housing 108, from which the digital camera 114 is removable. In alternative embodiments, the imaging booth 102 may be configured as an imaging unit. For example, the imaging booth 102 and all of its components may be scaled to fit within a handheld device that has an open port for positioning the sample. In such a case, the light sources 110 and digital camera 114 may also be part of the handheld device.

The first computing device 104 is communicatively coupled to the imaging booth 102 and to the digital camera 114. The first computing device 104 is configured to acquire and process images captured by the digital camera 114. In particular, the first computing device 104 converts the camera RGB values of the captured images to tristimulus XYZ values, as discussed in further detail below. In one embodiment, the first computing device 104 stores processed images and associated data (and possibly meta data relating to the sample) on a server 116. The server may also store data relating to a standard sample. In one embodiment, the first computing device 104 comprises a general purpose computing device or a special purpose computing device, such as a personal computer, a laptop computer, a tablet computer, a smart phone, or the like.

The second computing device 106 is a remote computer that is communicatively coupled to the server 116. The second computing device 106 is configured to retrieve and display the processed images for viewing and color evaluation (and thus comprises a display and/or printer). Color evaluation using the second computing device 106 may comprise visual and/or numerical evaluation, as discussed below. In one embodiment, the second computing device 106 comprises a general purpose computing device or a special purpose computing device, such as a personal computer, a laptop computer, a tablet computer, a smart phone, or the like.

In one embodiment, the second computing device 106 is coupled to a screen color calibration device 118 such as a screen colorimeter. The screen color calibration device 118 calibrates the colors displayed by the second computing device 106 so that visual color evaluation performed using the second computing device 106 is reliable. Although not illustrated, another screen color calibration device may be coupled to the first computing device 106.

In an alternative embodiment, a single computing device replaces the first computing device 104 and the second computing device 106. Thus, both processing and display of the images occur on a single computing device. In addition, color evaluation and image color difference computation may also occur on this single computing device. Thus, in this alternative embodiment, the server 116 may not be necessary.

In yet another embodiment, three different computing devices are used. In this case, a first computing device processes the images as described above and a second computing device displays the images as described above. A third computing device then performs computations that judge the similarity of the colors.

Figure 2:
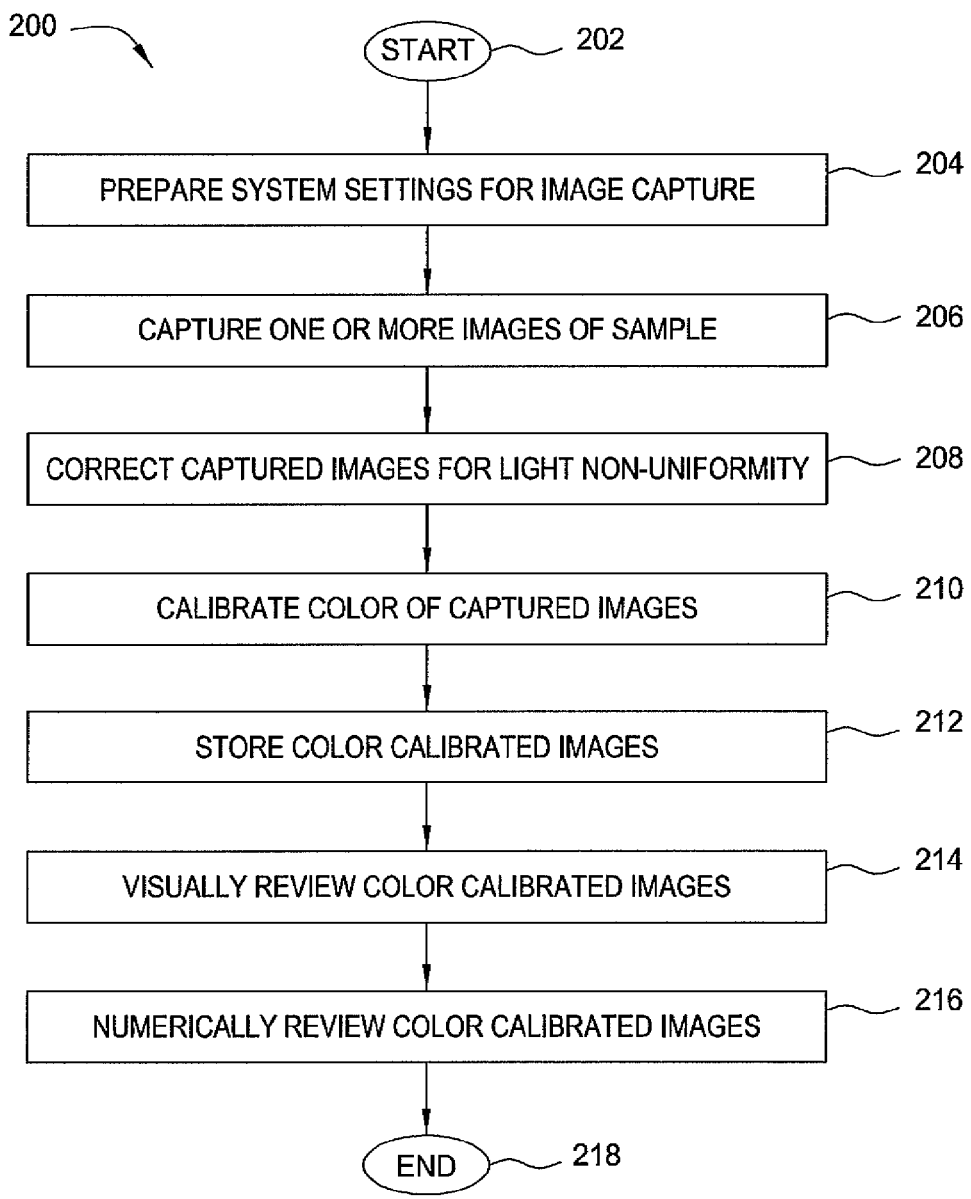
FIG. 2 is a flow diagram illustrating one embodiment of a method for evaluating a color sample, according to one embodiment of the present invention.

FIG. 2 is a flow diagram illustrating one embodiment of a method 200 for evaluating a color sample, according to one embodiment of the present invention. The method 200 may be implemented, for example, in conjunction with the system 100 illustrated in FIG. 1. The method 200 is not limited to implementation with the configuration illustrated in FIG. 1, however, and may be implemented in conjunction with systems whose configurations differ from the system 100.

The method 200 is implemented in step 202 and proceeds to step 204, where the settings of the system 100 are prepared for image capture. In particular, the sample to be evaluated and the calibration strip are positioned on the pedestal 112 of the imaging booth 102. One or more of the light sources 110 also is selected to illuminate the sample. In one embodiment, a sequence by which each selected light source 110 illuminates the sample one-by-one is specified. In addition, the digital camera 114 is positioned such that the sample and the calibration strip are within its field of view, and the gray card is used to calibrate the digital camera 114 for light intensity non-uniformity in the imaging plane.

In step 206, the digital camera 114 captures one or more images of the sample and the calibration strip. Any given one of the captured images will display both the sample and the calibration strip. As discussed above, multiple images under different reference illuminants may be captured. Imaging under multiple reference illuminants allows color capture from samples that cannot be measured using a spectrophotometer (as a spectrophotometer has too big an aperture to measure from small elements of a multicolored sample).

In step 208, the first computing device 104 corrects the captured images for light non-uniformity, in accordance with the gray card. Then, in step 210, the first computing device calibrates the color of the captured images, in accordance with the calibration strip, to produce color calibrated output images. In one embodiment, the first computing device 104 operates on the captured images in the RAW image file format.

In step 212, the color calibrated output images and/or meta data related to the sample is stored. In one embodiment, the output images and data are stored locally on the first computing device 104. In another embodiment, the output images and data are delivered by the first computing device 104 over a network to the server 116 for remote storage.

In step 214, the color calibrated output images are visually reviewed for approval. In one embodiment, review of the color calibrated output images involves retrieving the output images over the network and displaying the output images by the second computing device 106. Alternatively, in the non-distributed embodiment, the output images may be displayed on the first computing device 104. In one embodiment, images of multiple samples may be viewed at once on the display. In particular, visual review is based on the camera RGB values of the color calibrated output images. Visual review is facilitated by calibrating the screen color of the display using an International Color Consortium (ICC) profile created by the screen color calibration device 118.

In step 216, the color calibrated output images are numerically reviewed. In particular, the second computing device 106 (or first computing device 104) executes a program that calculates the difference in color and appearance between a pair of images (e.g., an image of a standard sample and an image of a batch sample). Specifically, all pixels of a given color in one of the images (e.g., the image of the batch sample) are compared to all pixels of the most similar color in the other image (e.g., the image of the standard sample). This comparison includes converting the camera RGB values of the captured images to XYZ tristimulus values. One technique for performing this comparison is discussed in further detail in below. Thus, display and review on the second computing device 106 allows for review and approval of samples based on remotely captured images.

The method 200 terminates in step 218.

The method 200 allows remote parties to verify color consistency between a standard sample and a set of batch samples, based on image comparison. The image comparison visually and numerically compares the colors of the standard sample and the batch samples. In this way, color consistency can be assured without the need to ship physical samples, and the production history for the color products can be archived for future reference.

As discussed above in connection with step 208, the first computing device 104 corrects the captured images for light non-uniformity, using a gray card. This process is well-known and involves scaling each pixel intensity to the mean pixel intensity in every image plane (R, G, B for each camera illuminant), image-by-image.

For example, let P be any one of the camera R, G, B image channels for any of the plurality of camera illuminants. In addition, let $P(i,j)$ be the ij pixel of the P image in the presence of test colors, and $P_0(i,j)$ be the ij pixel of the P image in the presence of the gray card. Then, for each of the nine P channels, the following steps are performed.

First, the image $P_0(i,j)$ and its mean $P_{mean}$ is acquired for all i, j. Next, a correction array $C(i, j)=P_{mean}/P_0(i, j)$ is constructed. Then, the test color image $P(i, j)$ is acquired. The corrected P image $P_{corr}(i,j)=P(i,j)*C(i,j)$ is then constructed.

As discussed above, the present invention allows images of samples to be color calibrated based on multiple images of the samples captured under different reference illumination conditions. In one embodiment, this calibration involves estimating the XYZ tristimulus values of a sample's reflectance under three illuminants, from the RGB camera values and from the RGB camera values of a simultaneously-imaged chart of calibration samples. These calibration samples together comprise a calibration chart. These operations are performed, for example, in accordance with step 216 of the method 200. In one embodiment, the tristimulus values of the reflectance under the three reference illuminants (column 9-vector r) are estimated from the reflectance's measured camera RGB values under the same three illuminants (column 9-vector d) in conjunction with a number K of simultaneously acquired calibration samples whose pre-measured reflectance spectra are used to compute tristimulus values that are stored in a database.

The calibration values in this case comprise a 9×K matrix D of camera values from the calibration chart and a 9×K matrix $R_T$ of tristimulus values from the same calibration chart, where K is the number of reflectances. For example, a color chart having K=24 reflectances may be used. The matrix D from the calibration chart is measured by the camera under the same illuminants, and at the same times, as is an image of test reflectances, and the matrix $R_T$ is pre-computed from the reflectance values pre-measured from the calibration chart, in conjunction with color matching functions and three reference-illuminant spectra.

To calibrate, a 9×9 matrix M and an offset vector b are computed so as to estimate the tristimulus 9-vector r of any test reflectance. The matrix M and offset vector b map (as closely as possible) all of the database camera value 9-vectors to corresponding tristimulus 9-vectors as follows:

$$R_T = MD + b \quad \text{(EQN. 1)}$$

EQN. 1 may be represented as a homogeneous equation as:

$$R_T = M_A D_A \quad \text{(EQN. 2)}$$

where $M_A=[M\ b]$ is the 9×10 matrix comprising M right-augmented by the column vector b, and $D_A=[D'\ 1']'$ is the 10×9 matrix comprising D augmented from the bottom by a row K-vector 1 of 1's. Here, D' is the transpose of D. To estimate $M_A$, the following least-square approximation is used:

$$M_A = R_T \text{pinv}(D_A) = R_T D_A'(D_A D_A')^{-1} \quad \text{(EQN. 3)}$$

In an alternative embodiment, a 3×K matrix stores the data for each illuminant handled separately. The 3×3 calibration matrix M is calculated separately for each illuminant, and each image is corrected using the corresponding M matrix.

Once calibration is performed as set forth above, a new tristimulus 9-vector $r_a$ is computed for each pixel from its measured camera 10-vector $d_A$ (the column vector d extended by 1 in the tenth component), as:

$$r_a = M_A D_A \quad \text{(EQN. 4)}$$

After retrieving the required sets of tristimulus values, one can convert the XYZ values to screen RGB values using conventional color management techniques based on International Color Consortium (ICC) profiles. For example, the techniques described by Morovic in "Color Gamut Mapping" (Colour Engineering: Achieving Device Independent Colour, Chapter 13, pp. 297-317, Wiley 2002) may be used. These steps result in a complete transformation between camera values under three illuminants and displayed tristimulus values under another three illuminants.

In one embodiment of the above, the number of calibration database reflectances is K=24. This represents the number of color samples used for calibration. In practice, one may have more than twenty-four samples. In one embodiment, the reflectance values fall in a range from zero to one.

r is a column 9-vector, where r(1) is the R value of reflectance under camera illuminant 1; r(2) is the G value of reflectance under camera illuminant 1; . . . ; and r(9) is the B value of reflectance under camera illuminant 3.

$d_A$ is a column 10-vector, where $d_A(1)$ is the X value of reflectance under display illuminant 1; $d_A(2)$ is the Y value of reflectance under display illuminant 1; . . . ; $d_A(9)$ the Z value of reflectance under display illuminant 3; and $d_A(10)=1$.

$R_T$ is a 9×24 matrix, where $R_T(1,1)$ is the R value of reflectance 1 under camera illuminant 1; $R_T(1,2)$ is the R value of reflectance 2 under camera illuminant 1; $R_T(2,1)$ is the G value of reflectance 1 under camera illuminant 1; and $R_T(2,2)$ is the G value of reflectance 2 under camera illuminant 1.

$D_A$ is a 9×24 matrix, where $D_A(1,1)$ is the X value of reflectance 1 under display illuminant 1; $D_A(1,2)$ is the X value of reflectance 2 under display illuminant 1; $D_A(2,1)$ is the Y value of reflectance 1 under display illuminant 1; $D_A(2,2)$ is the Y value of reflectance 2 under display illuminant 1; . . . ; $D_A(9,24)$ is the Z value of reflectance 24 under display illuminant 3; $D_A(10,1)=1$; . . . ; and $D_A(10,24)=1$.

Thus, multiple digital spectra of known illuminants are used, in conjunction with the acquired image RGB values, to compute the XYZ tristimulus values for a sample under the known illuminants. Then, if one wishes to display the same colors that are seen in the imaging booth 102, the spectra of the real illuminants (i.e., the illuminants under which the images of the sample are captured) are adjusted to match the digital spectra used to compute the XYZ tristimulus values.

Given an image of a standard sample and a batch sample that comprises a plurality of colored pixels, the methods described below predict the visual color match between the standard sample and the batch sample. The approach in this case is as follows.

First, the region to be compared is excerpted from the batch sample images and from the standard sample image. Optionally, the images are quantized into a smaller number of colors (e.g., 256 colors). Quantization may be performed using, for example, the methods described Wu in "Efficient Statistical Computations for Optimal Color Quantization" (Graphics Gems, vol. II, p. 126-133) or By Dekker in "Kohonen Neural Networks for Optimal Color Quantization" (Network Computation in Neural Systems, Vol. 5, No. 3, Institute of Physics Publishing, 1994). In one embodiment, the standard and batch images are quantized separately, but it is also possible to quantize the standard and the batch images to a common palette. The camera RGB values for the selected image regions are then converted to tristimulus XYZ values under each light using the (10×9) M matrix, described above.

For each pixel color in the standard image, the color difference relative to every color in the batch image is computed. In one embodiment, the color difference for a color pair is computed as $\Delta E$, which describes the distance between two colors in color space. $\Delta E$ for the closest color in the batch image is weighted by the pixel frequency of the color in the standard image. The weighted sum over all colors in the standard image provides a color difference measure that correlates with a visual comparison between the standard image and the batch image. The same batch image color may be mapped to multiple standard image colors.

Limiting the comparison to the closest colors automatically disregards colors in the batch image that are not present in the standard image (and are therefore considered not relevant to the visual comparison). Alternative embodiments of the image difference calculation include techniques based on image color histogram differences. The disclosed method essentially "looks for the standard in the batch" and is not impacted by differences in relative amounts of each color between the standard image and the batch image. This is a desirable characteristic when the goal is to evaluate color consistency between a pair of samples. The present invention especially useful when, for example, comparing a flat fabric standard swatch having a relatively narrow distribution of pixel colors of a uniform color with a fabric batch that is highly textured and therefore has a much wider distribution of pixel colors. The present invention is also useful when, for example, comparing pairs having printed or patterned regions of distinctly different colors.

Additionally, the percent of standard sample colors (weighted by total pixel count for the standard sample color) that can be matched to any color in the batch samples (e.g., within a tolerance of $\Delta E$) is identified. The percent of the batch colors that are matched to the standard colors is also identified. These numbers are correlated, but are also individual outputs.

Figure 3:
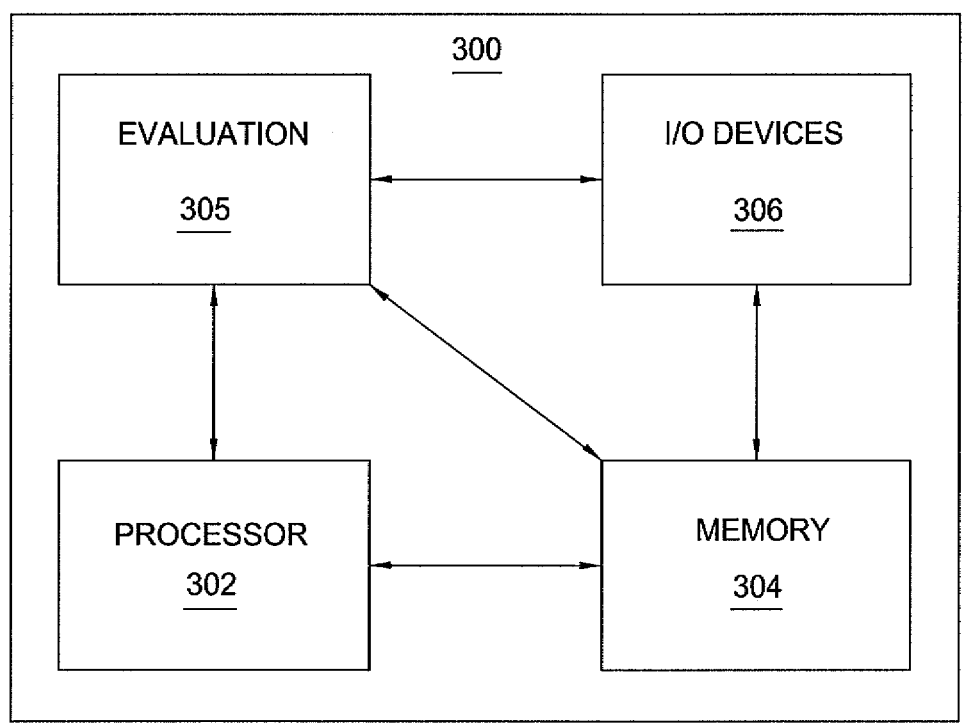
FIG. 3 is a high-level block diagram of the present invention that is implemented using a general purpose computing device.

Thus, the present invention evaluates the color difference between a first image (e.g., of a standard sample) and a second image (e.g., a batch sample) by comparing all of the pixels of one color in the first image with all of the pixels of the most similar color in the second image FIG. 3 is a high-level block diagram of the present invention that is implemented using a general purpose computing device 300. In one embodiment, a general purpose computing device 300 comprises a processor 302, a memory 304, an evaluation module 305 and various input/output (I/O) devices 306 such as a display, a keyboard, a mouse, a stylus, a wireless network access card, a colorimeter, and the like. In one embodiment, at least one I/O device is a storage device (e.g., a disk drive, an optical disk drive, a floppy disk drive). It should be understood that the evaluation module 305 can be implemented as a physical device or subsystem that is coupled to a processor through a communication channel.

Alternatively, as discussed above, the evaluation module 305 can be represented by one or more software applications (or even a combination of software and hardware, e.g., using Application Specific Integrated Circuits (ASIC)), where the software is loaded from a storage medium (e.g., I/O devices 306) and operated by the processor 302 in the memory 304 of the general purpose computing device 300. Thus, in one embodiment, the evaluation module 305 for evaluating the color of an image as described herein with reference to the preceding Figures, can be stored on a computer readable storage device (e.g., RAM, magnetic or optical drive or diskette, and the like).

It should be noted that although not explicitly specified, one or more steps of the methods described herein may include a storing, displaying and/or outputting step as required for a particular application. In other words, any data, records, fields, and/or intermediate results discussed in the methods can be stored, displayed, and/or outputted to another device as required for a particular application. Furthermore, steps or blocks in the accompanying Figures that recite a determining operation or involve a decision, do not necessarily require that both branches of the determining operation be practiced. In other words, one of the branches of the determining operation can be deemed as an optional step.

While the foregoing is directed to embodiments of the present invention, other and further embodiments of the invention may be devised without departing from the basic scope thereof. Various embodiments presented herein, or portions thereof, may be combined to create further embodiments. Furthermore, terms such as top, side, bottom, front, back, and the like are relative or positional terms and are used with respect to the exemplary embodiments illustrated in the Figures, and as such these terms may be interchangeable.

What is claimed is:

1. A method for evaluating a color of a sample, comprising:
acquiring a plurality of images of the sample, where each of the plurality of images is acquired under a different one of a first plurality of illuminants and each of the plurality of images contains a set of samples of known spectral reflectance;
computing a single mapping that transforms all of first pluralities of values into second pluralities of values, wherein each plurality of values of the first pluralities of values comprises each red, green, and blue sensor value of each sample in the set of samples under each of the first plurality of illuminants, and each plurality of values of the second pluralities of values comprises each tristimulus X, Y, and Z reflectance value of each sample in the set of samples under each of a second plurality of illuminants; and
color calibrating the plurality of images using the single mapping, wherein the color calibrating results in a plurality of color calibrated images each comprising a plurality of pixels.

2. The method of claim 1, further comprising:
evaluating a color of the sample relative to a standard.

3. The method of claim 2, wherein the evaluating comprises:
comparing at least one of the plurality of color calibrated images to an image of the standard.

4. The method of claim 3, wherein the comparing comprises:
comparing all pixels that are of a first color in the image of the standard to all of the plurality of pixels of a second color in the at least one of the plurality of color calibrated images, wherein the second color is a color in the at least one of the plurality of color calibrated images that is most similar to the first color in the image of the standard.

5. The method of claim 4, further comprising:
converting a set of RGB values describing a reflectance of the sample to a set of XYZ tristimulus values.

6. The method of claim 5, wherein the converting comprises:
computing the set of XYZ tristimulus values for the sample under a known illuminant, wherein the computing is performed in accordance with the set of RGB values and a digital spectrum of the known illuminant.

7. The method of claim 6, further comprising:
matching a spectrum of at least one of the first plurality of illuminants to the digital spectra.

8. The method of claim 1, further comprising:
storing the plurality of color calibrated images on a remote storage device.

9. The method of claim 1, wherein at least one of the first plurality of illuminants is a daylight illuminant.

10. The method of claim 1, wherein at least one of the first plurality of illuminants is a tungsten illuminant.

11. The method of claim 1, wherein at least one of the first plurality of illuminants is a fluorescent illuminant.

12. The method of claim 1, wherein the acquiring is performed on a first computing device, and the color calibrating is performed on a second computing device that is remote relative to the first computing device.

13. A non-transitory computer readable storage device containing an executable program for evaluating a color of a sample, where the program performs steps comprising:
- acquiring a plurality of images of the sample, where each of the plurality of images is acquired under a different one of a first plurality of illuminants and each of the plurality of images contains a set of samples of known spectral reflectance;
- computing a single mapping that transforms all of first pluralities of values into second pluralities of values, wherein each plurality of values of the first pluralities of values comprises each red, green, and blue sensor value of each sample in the set of samples under each of the first plurality of illuminants, and each plurality of values of the second pluralities of values comprises each tristimulus X, Y, and Z reflectance value of each sample in the set of samples under each of a second plurality of illuminants; and
- color calibrating the plurality of images using the single mapping, wherein the color calibrating results in a plurality of color calibrated images each comprising a plurality of pixels.

* * * * *